US006446194B1

United States Patent
Eisen et al.

(10) Patent No.: US 6,446,194 B1
(45) Date of Patent: Sep. 3, 2002

(54) VIRTUAL REGISTER RENAMED INSTRUCTION ISSUE FOR EXECUTION UPON VIRTUAL/PHYSICAL RENAME BUFFER WRAP AROUND DETECTION SIGNALING AVAILABLE PHYSICAL REGISTER

(75) Inventors: Susan Elizabeth Eisen, Austin; James Edward Phillips, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/350,029

(22) Filed: Jul. 8, 1999

(51) Int. Cl.[7] .................................................. G06F 9/38
(52) U.S. Cl. ........................ 712/216; 712/217; 712/219
(58) Field of Search ................................. 712/216, 217, 712/219

(56) References Cited

U.S. PATENT DOCUMENTS

| 5,758,117 A | 5/1998 | Patel et al. .................. 712/217 |
| 6,122,656 A | * 9/2000 | Witt ............................ 709/100 |

* cited by examiner

*Primary Examiner*—Kenneth S. Kim
(74) *Attorney, Agent, or Firm*—Duke W. Yee; Mark E. McBurney; Michael R. Nichols (57) ABSTRACT

A method for wrap detection in a microprocessor system, the system including a plurality of rename buffers. The method includes performing a two's complement subtraction of a completion pointer from a target pointer, wherein a carry out results from the subtraction. The method further includes comparing the carryout and a virtual bit associated with a location to produce a result. The result is compared to the most significant bit of the target pointer and if there is a match between the most significant bit of the second pointer and the result, an indication is made that the instruction may issue. A system for utilizing the above method of wrap detection includes a means for performing a two's complement subtraction of a completion pointer from a target pointer, wherein a carry out results from the two's complement subtraction. The system further includes a means for performing an exclusive OR operation using the carry out and a virtual bit associated with a highest rename buffer within the plurality of rename buffers to form a result. An additional means for performing an exclusive OR operation is provided to compare the result with a most significant bit of the target pointer. Finally, an indicating means is provided to indicate a match between the most significant bit of the target pointer and the result, and therefore whether an instruction can be issued.

21 Claims, 8 Drawing Sheets

VIRTUAL REGISTER RENAMED INSTRUCTION ISSUE FOR EXECUTION UPON VIRTUAL/PHYSICAL RENAME BUFFER WRAP AROUND DETECTION SIGNALING AVAILABLE PHYSICAL REGISTER

BACKGROUND OF THE INVENTION

1. Technical Field

The present invention relates to microprocessors, and more particularly to the efficient utilization of rename buffers in a superscalar processor.

2. Description of Related Art

Microprocessors have been made faster and more powerful through the use of the reduced instruction set computer (RISC) processor. Further advances in the field of RISC processors have led to the development of superscalar processors. Such processors allow speculative execution, out-of-order instruction execution, and dispatching of instructions beyond dependent instructions. To support such speculative and out-of-order operations in superscalar processors, rename buffers have been utilized. A rename buffer allows a dispatch unit to rename memory buffers so that a location to which execution units temporarily cannot write results can be assigned rename value locations for an operand/result. The rename buffers are limited in number, causing decreased performance when all of the rename buffers are busy but not all of the execution units in the processor are busy. To help improve performance during times when all of the rename buffers are busy, a method for using a virtual rename buffer has been disclosed. A virtual rename buffer, as its name implies, is not actually a physical buffer. Rather, it is simply an address that is assigned to an instruction so that the instruction can be dispatched to the appropriate execution unit. Thus, the instruction can be operated upon but cannot be finished until an actual or physical rename buffer becomes available. This saves time by allowing part of the execution of the instruction to be accomplished while waiting on a physical buffer to open up.

Patel, et. al, (U.S. Pat. No. 5,758,117) provides a method and system for reducing dispatch stalls and for efficiently utilizing rename buffers in a superscalar processor. The method includes tracking allocation and deallocation of real rename buffers for instructions dispatched by a dispatch unit, and providing at least one virtual rename buffer for allocation of an instruction when the real rename buffers have been allocated. The method further includes tagging the instruction allocated to the at least one virtual rename buffer with a rename buffer busy signal, wherein the rename buffer busy signal indicates to an execution unit of the processor that the instruction cannot be completed.

The system disclosed by Patel, et. al, includes a plurality of rename buffers, a dispatch unit coupled to the plurality of rename buffers, and an allocation/deallocation table coupled to the dispatch unit and the plurality of rename buffers. Further, the table includes a plurality of real rename buffer slots and at least one virtual rename buffer slot. Additionally, a rename busy signal is provided via the table for an instruction allocated to the at least one virtual rename buffer slot.

Greater efficiency results from effectively controlling the use of virtual rename buffers in conjunction with real rename buffers. The virtual rename buffers allow dispatches to execution units to continue even after all of the real rename buffers have been allocated. Thus, processor performance is improved by reducing the number of stalls in a dispatch unit due to a lack of real rename buffers.

Detecting the wrapping of a multiple slotted resource is often required in microprocessor designs, particularly in buffer renaming. Virtual renaming will likely become more important in microprocessor designs as the number of rename buffers increases due to the increase of superscalar processors and the increase of execution pipe latencies to obtain higher frequencies in processors.

Figure 1:
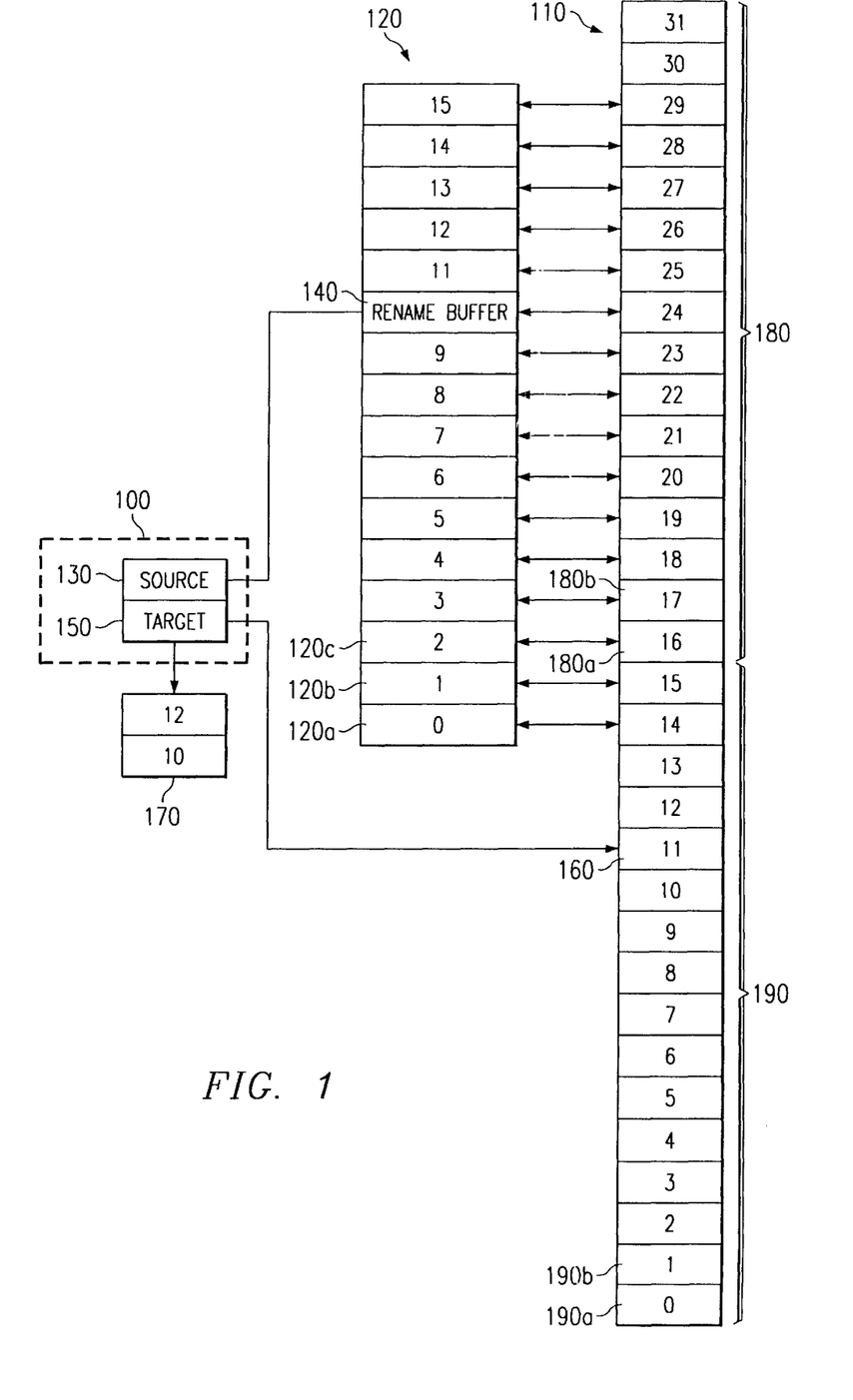
FIG. 1 illustrates a prior art method of mapping virtual rename buffers.

As an example of a virtual rename scheme that has previously been disclosed, consider FIG. 1. An instruction 100 can be dispatched to superscalar units based on a 32 buffer virtual rename space 110 while implementing only 16 physical rename buffers 120. The dispatched instruction's sources 130 are mapped to the rename buffer 140 allocated for the instruction producing the previous result, assuming that the instruction 100 is dependent upon a previous instruction. The target 150 is allocated a unique rename buffer 160 from the 32 virtual rename space. These results are saved in an instruction queue 170 and the instruction 100 can be issued. However, the instruction 100 cannot be issued to the execution unit from the queue 170 until one of the physical buffers 120 associated with the unique rename buffer 160 is free.

One method of mapping this scheme is to divide the 32 virtual rename space 110 into an upper portion 180 and lower portion 190 and to overlay the 16 physical rename buffers 120 over the upper portion 180 and the lower portion 190 of the 32 virtual rename space. Thus, physical buffer '0' 120*a* is mapped onto virtual buffers '0' 190*a* and '16' 180*a*; physical buffer '1' 120*b* is mapped to virtual buffers '1' 190*b* and '17' 180*b*, and so on. Using this map, the instruction allocated to virtual buffer '16' 180*a* cannot issue until the instruction allocated to virtual buffer '0' 190*a* is completed, thereby freeing physical buffer '0' 120*a*. Determining whether or not the physical buffer associated with the allocated virtual buffer is free requires wrap detection. For a superscalar processor in which instruction queues may issue to multiple units in a speculative or out-of-order fashion, the determination of whether or not to issue instructions to the execution unit becomes a critical path in the machine, even more so as cycle times become more aggressive. One solution is to add a cycle to the issue determination to alleviate the critical path.

Figure 2:
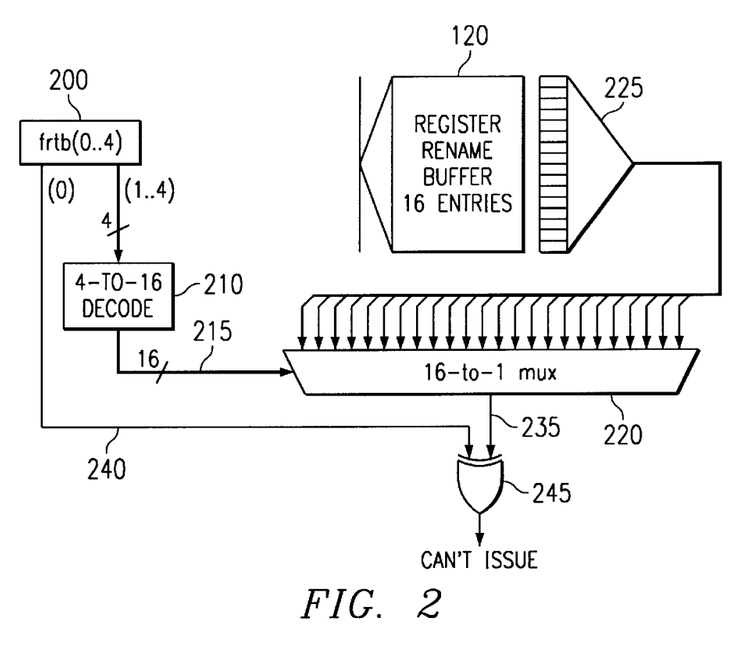
FIG. 2 illustrates a prior art logical implementation of a virtual rename scheme.

The logic used to implement this solution is shown in FIG. 2. The encoded address of each of the 32 virtual rename buffers 110 includes one high order bit in addition to the encoded address of the corresponding physical buffer. Similarly, each of the 16 physical buffers 120 have a "virtual bit" associated with it to indicate whether the buffer is associated with the upper portion 180 or the lower portion 190 of the virtual rename space 110. For example, before any of the buffers are allocated, each of these 16 virtual bits would contain a logic '0' to indicate that the physical buffer is currently mapped to the lower portion 190 of the virtual rename space 110. That is, the virtual bit associated with physical buffer '0' 120*a* would indicate that the buffer is currently associated with virtual buffer '0' 190*a*; the virtual bit associated with physical buffer '1' 120*b* would indicate that the buffer is currently associated with virtual buffer '1' 190*b*, and so on. Once the contents of a physical buffer are written into the architected buffer file, the virtual bit associated with that physical buffer is toggled to indicate that the physical buffer now maps to the opposite half of the virtual rename space. Thus, when physical buffer '0' with a virtual bit value of '0' 120*a* writes its contents to the architected buffer file, the virtual bit is toggled from '0' to '1' to indicate that physical buffer '0' 120*a* is now mapped to virtual rename buffer 16 180*a*.

Referring now to FIG. 2, the four lower order bits of the target buffer pointer 200 are input to a 4-to-16 decoder 210. The 16 orthogonal signals 215 are connected to the select inputs of the 16-to-1 multiplexer 220. The 16 virtual bits 225 associated with the 16 physical rename buffers 120 are connected to the input of the multiplexer 220 such that the multiplexer uses the 16 orthogonal signals 215 to select the virtual bit corresponding to the physical buffer mapping to the target buffer pointer 200. The virtual bit 235 that is selected by the multiplexer 220 is compared with the higher order bit 240 of the target buffer pointer 200 using an exclusive or gate 245. If the virtual bit 235 and the higher order bit 240 match, then the exclusive or gate 245 will output a '0' indicating that the instruction may issue to the execution unit; else if the signals do not match, then the output will be a '1' indicating that the instruction is not allowed to issue.

The problem with the solution illustrated in FIG. 2 is that the capacitive load associated with the decode logic requires repowering to drive the load. Therefore, additional stages are needed to determine issue. As the virtual rename space becomes larger, the capacitive load grows exponentially. The latch bits may be replicated to avoid the repower stages, but this increases the chip area and loads critical signals in the dispatch cycle. Furthermore, with this implementation, the multiplexer requires an input equal in size to the number of physical rename buffers to determine whether to issue. This increases both the wiring area and the power dissipation as the number of rename buffers is increased. Thus, a small, fast, and scalable method of wrap detection is needed to increase the utility of virtual renaming as renaming schemes become larger.

SUMMARY OF THE INVENTION

Accordingly, the present invention meets the need for a small, fast, and scalable method of wrap detection. The method reduces the capacitive load on the virtual rename address, thereby avoiding delay and costly repowering stages. The method allows for a small wiring area while allowing pre-existing logic to be utilized.

Two pointers are used to manage buffer renaming: the allocation pointer which points to the next virtual rename buffer to be allocated to a target, and the completion pointer which points to the next physical buffer position to free as instructions complete. In addition, a target buffer pointer is used to capture the value of the allocation pointer before it is incremented in preparation for allocation of the next rename buffer. When a rename buffer is allocated to an instruction's target, the current value of the allocation pointer is assigned to the instruction as a target and is placed with the instruction into an instruction queue as the target buffer pointer. The allocation pointer is then incremented by modular the size of the virtual buffer to be ready for allocation to a subsequent instruction's target. When instructions complete, the completion pointer is incremented by modular the size of the virtual buffer. A virtual bit is associated with each of the physical rename buffers. The lower order bits of the target buffer pointer are compared to the lower order bits of the completion pointer to determine if the target buffer pointer is greater than or equal to the completion pointer. The most significant bit of the target buffer pointer indicates whether the virtual rename buffer is in the upper half or lower half of the virtual rename space. If the lower order bits of the target buffer pointer are greater than or equal to the lower order bits of the completion pointer and the highest physical buffer is associated with the same half of the virtual rename space as the target buffer pointer, then the instruction may issue. Else, if the lower order bits of the target buffer pointer are smaller than the lower order bits of the completion pointer then the instruction may not issue unless the highest physical buffer of the physical rename space is associated with the opposite half of the virtual rename space as the target buffer pointer. Such a logical implementation avoids the need to sample the virtual bit of the desired physical buffer, that is the physical buffer corresponding to the virtual rename buffer allocated to a particular instruction.

The above steps are the logical steps used by the wrap detector to determine if an instruction can issue in the virtual renaming scheme. As with most logic, the logic can be tuned to perform the steps in order of the availability of signals.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

It is important to note that while the present invention has been described in the context of a fully functioning microprocessor system, those of ordinary skill in the art will appreciate that the method of the present invention is capable of being implemented using various logic systems and that the present invention applies equally regardless of the system used to carry out the method.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Figure 3:
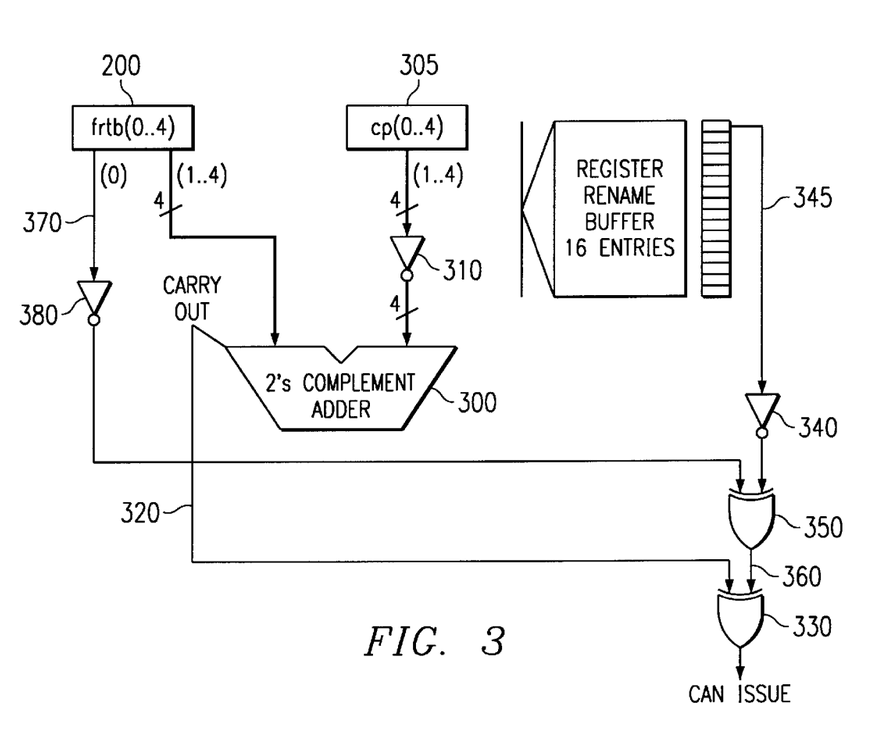
FIG. 3 illustrates a logical implementation of a virtual rename scheme in accordance with the present invention.

Referring now to FIG. 3, a preferred embodiment of the present invention is illustrated. The four lower order bits of the target buffer pointer 200 (tbp(1 . . . 4)) are compared with the four lower order bits of the completion pointer 305 (cp(1 . . . 4)) to determine whether the bits of the target buffer pointer are greater than or equal to the bits of the completion pointer. This is accomplished by a two's complement subtraction. The bits tbp(1 . . . 4) are input as an operand into a two's complement adder 300. The bits cp(1 . . . 4) are inverted by an inverter 310 and the result is input as a second operand into the two's complement adder 300. The adder 300 produces a carry bit 320 from the two's complement addition. If the carry bit 320 is a '1', then tbp(1 . . . 4) is greater than or equal to cp(1 . . . 4), else if the carry bit is a '0', then tbp(0 . . . 4) is smaller than cp(0 . . . 4). The carry bit 320 is input into an Exclusive Or gate 330. The virtual bit (v(15)) 345 associated with the highest of the 16 physical rename buffers 120 is inverted by inverter 340. The most significant bit 370 (tbp(0)) of the target buffer pointer 200 is inverted in an inverter 380. The outputs of the inverter 340 and the inverter 380 is input into the Exclusive Or gate 350. Thus, the output 360 of the Exclusive Or gate 350 is the same as the virtual bit at the desired physical buffer location. This output 360 is Exclusive Or'd with the carry bit 320 using an Exclusive Or gate 330. If the output of the Exclusive Or gate 330 is '1', the instruction can issue, else the instruction must not be allowed to issue.

Referring now to FIGS. 4–14, pictorial representations of the virtual and physical rename spaces in various states of operation of the preferred embodiment are illustrated. The virtual rename space 400 contains 32 virtual buffers '0'–'31' while the physical rename space 410 contains 16 physical buffers '0'–'15'. The target buffer pointer 200 (tbp(0 . . . 4)) points to one of the 32 virtual buffers in the virtual rename space 400, and the completion pointer 305 (cp(1 . . . 4)) points to one of the 16 physical buffers 410. The values of the pointers 200 and 305 point to the next virtual rename buffer to be allocated to a target and the next physical buffer position to free as instructions complete, respectively.

Figure 4:
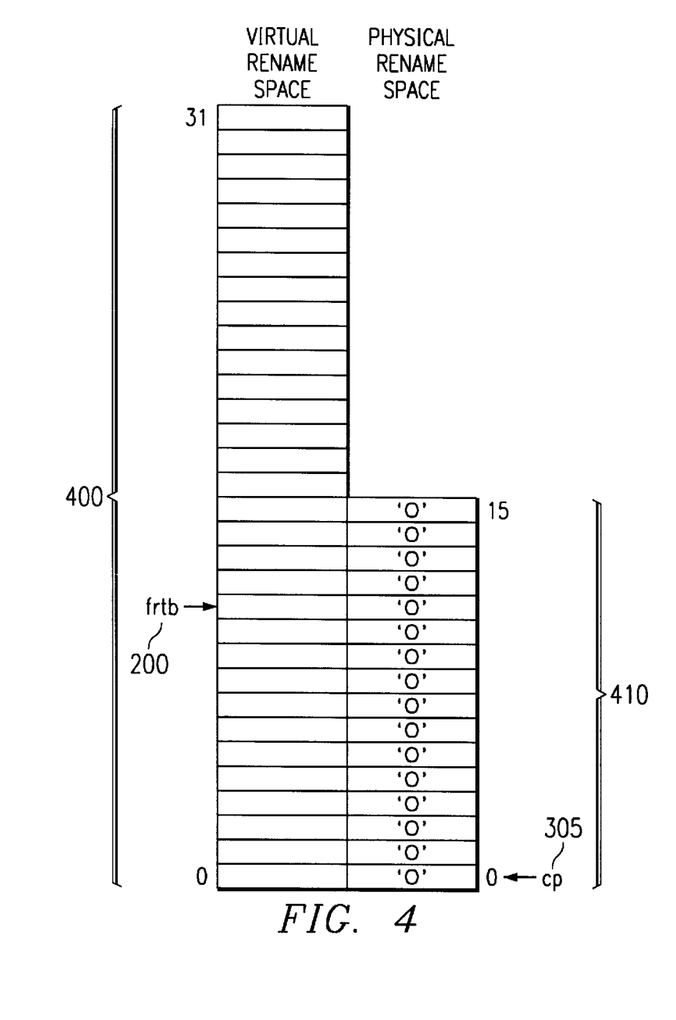
FIGS. 4,5,6,7,8,9,10,11,12,13, and 14 illustrate examples of the virtual rename space and the physical rename space of the present invention in various states of operation.

Referring to FIG. 4, the target buffer pointer 200 points to virtual buffer '11', and the completion pointer 305 points to physical buffer '0'. Because the target buffer pointer 200 points to one of the lower 16 virtual buffers, the value of the most significant bit of the target buffer pointer 200 is '0'. Similarly, because the physical buffer address of physical buffer '15' points to a location that corresponds to one of the lower 16 virtual buffers, the value of the virtual bit for physical buffer '15' is '0'. Therefore, the Exclusive Or 350 in FIG. 3 produces a '0' when the addresses are as shown in FIG. 4. Furthermore, the two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. This may be visualized by observing that the target buffer pointer 200 points to a location that is at least as high as the completion pointer 305. Thus, Exclusive Or 330 of FIG. 3 produces a '1' indicating that the instruction can issue. This result may be checked by noting that the physical buffer '11' is associated with the virtual rename buffer '11' in FIG. 4.

Figure 5:
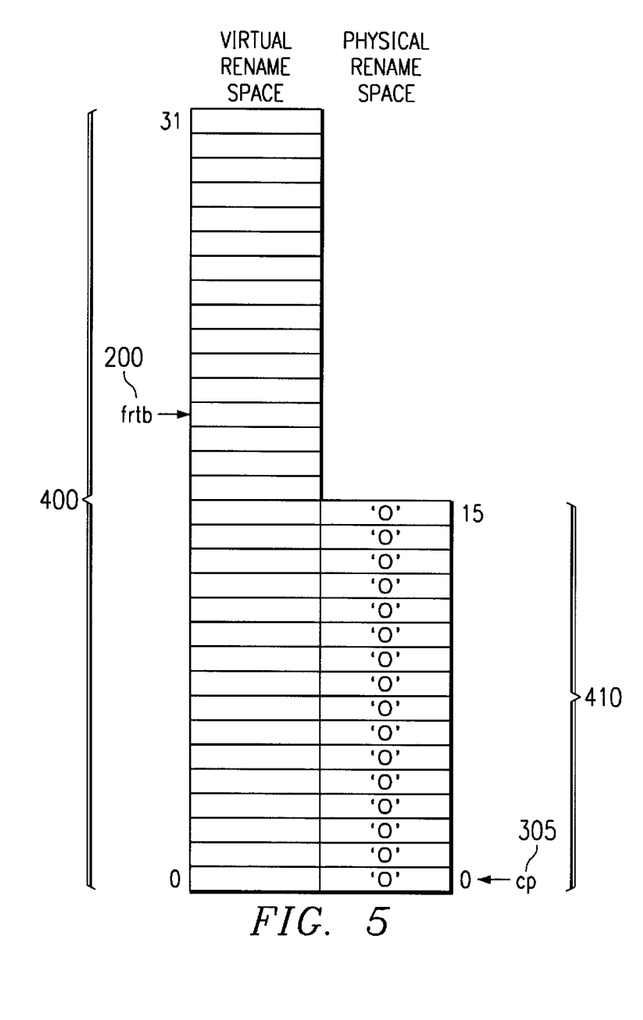

Referring now to FIG. 5, the target buffer pointer 200 points to one of the upper 16 virtual buffers so that the value of the most significant bit of the target buffer pointer 200 is '1'. The physical buffer address of physical buffer '15' points to a location that corresponds to one of the lower 16 virtual buffers so that the value of the virtual bit of physical buffer '15' is '0'. Therefore, the Exclusive Or 350 in FIG. 3 produces a '1' when the addresses are as shown in FIG. 5. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '0' indicating that the instruction cannot issue. This result may be checked by noting that the physical buffer '3' is not associated with the virtual rename buffer '19' in FIG. 5. The instruction thus cannot be issued until physical buffer '3' is associated with virtual rename buffer '19'.

Figure 6:
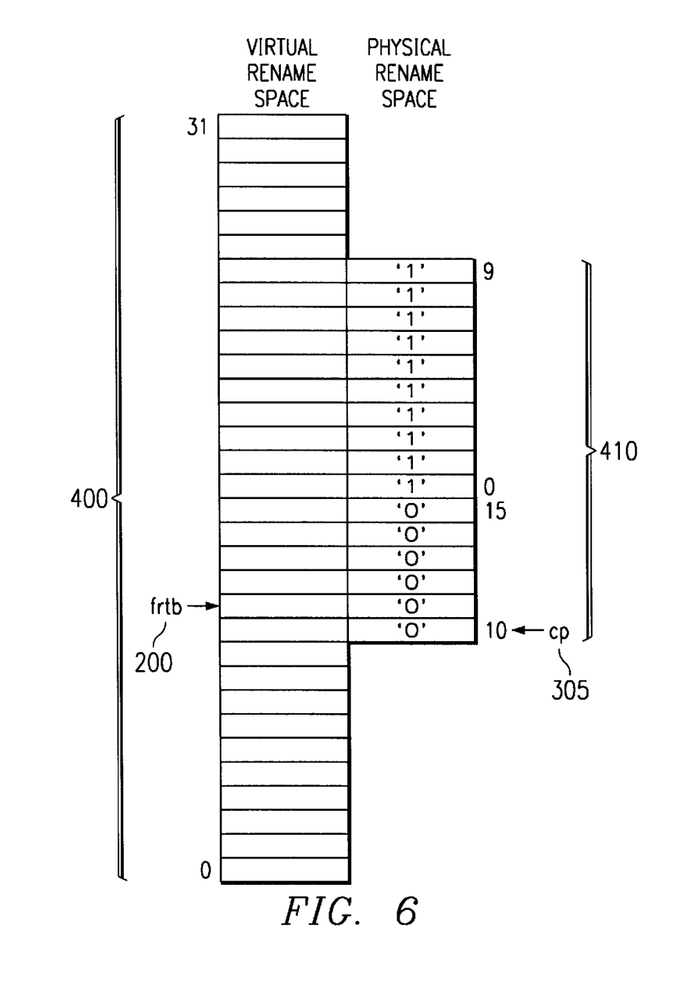

Referring now to FIG. 6, the target buffer pointer 200 points to one of the lower 16 virtual buffers so that the value of the most significant bit of the target buffer pointer 200 is '0'. The physical buffer address of physical buffer '15' points to a location that corresponds to one of the lower 16 virtual buffers so that the value of the virtual bit of physical buffer '15' is '0'. Therefore, the Exclusive Or 350 in FIG. 3 produces a '0' when the addresses are as shown in FIG. 6. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '1' indicating that the instruction can issue. This result may be checked by noting that the physical buffer '11' is associated with the virtual rename buffer '11' in FIG. 6. The instruction thus can be issued.

Figure 7:
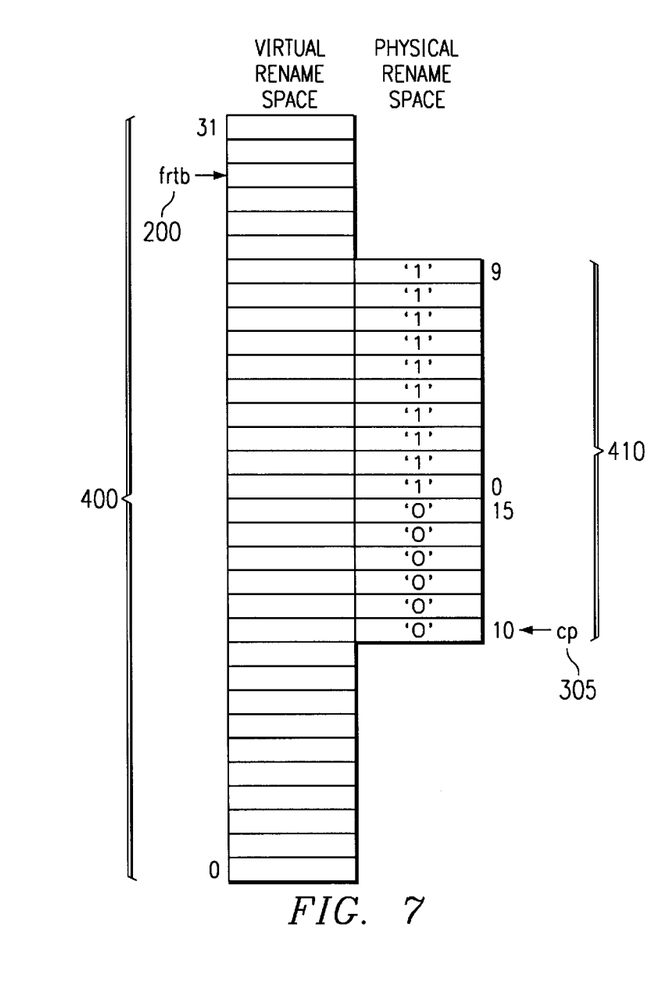

Referring now to FIG. 7, the target buffer pointer 200 points to one of the upper 16 virtual buffers so that the value of the most significant bit of the target buffer pointer 200 is '1'. The physical buffer address of physical buffer '15' points to a location that corresponds to one of the lower 16 virtual buffers so that the value of the virtual bit of physical buffer '15' is '0'. Therefore, the Exclusive Or 350 in FIG. 3 produces a '1' when the addresses are as shown in FIG. 7. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '0' indicating that the instruction cannot issue. This result may be checked by noting that the physical buffer '13' is not associated with the virtual rename buffer '29' in FIG. 7. The instruction thus cannot be issued until physical buffer '13' is associated with virtual rename buffer '29'.

Figure 8:
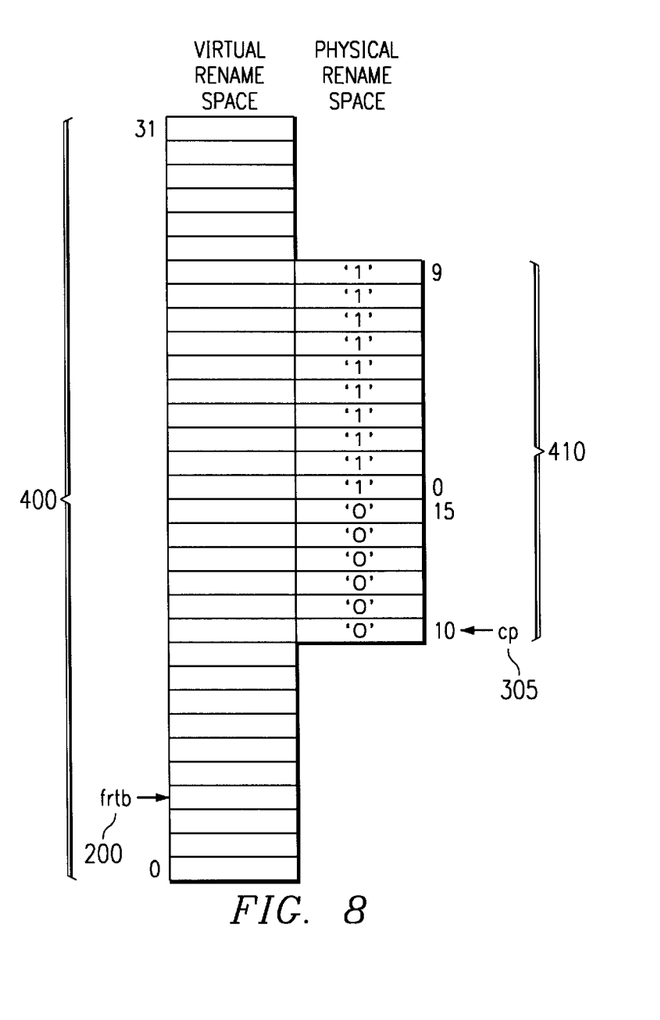

Referring now to FIG. 8, the target buffer pointer 200 points to one of the lower 16 virtual buffers so that the value of the most significant bit of the target buffer pointer 200 is '0'. The physical buffer address of physical buffer '15' points to a location that corresponds to one of the lower 16 virtual buffers so that the value of the virtual bit of physical buffer '15' is '0'. Therefore, the Exclusive Or 350 in FIG. 3 produces a '0' when the addresses are as shown in FIG. 8. The two's complement subtraction of the four lower order bits of the completion pointer 305 from the four lower order bits of the target buffer pointer 200 results in the carry out 390 in FIG. 3 being a '0'. That is, the lower order bits of the target buffer pointer 200 is not greater than or equal to the lower order bits of the completion pointer 305. Thus, Exclusive Or 330 of FIG. 3 produces a '0' indicating that the instruction cannot issue. This result may be checked by noting that the physical buffer '3' is not associated with the virtual rename buffer '3' in FIG. 8. The instruction thus cannot be issued until physical buffer '3' is associated with virtual rename buffer '3'.

Figure 9:
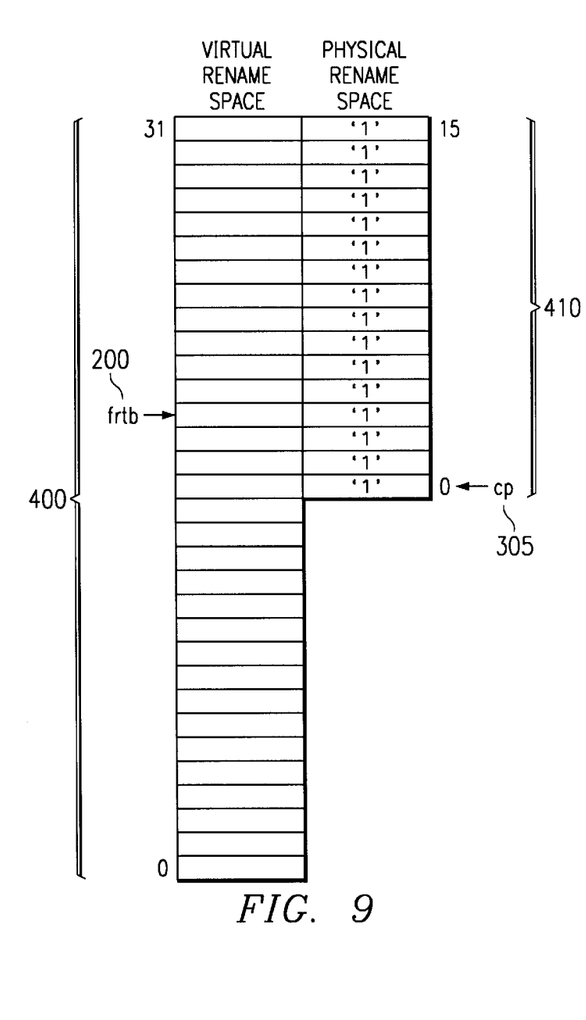

Referring now to FIG. 9, the target buffer pointer 200 points to one of the upper 16 virtual buffers so that the value of the most significant bit of the target buffer pointer 200 is '1'. The physical buffer address of physical buffer '15' points to a location that corresponds to one of the upper 16 virtual buffers so that the value of the virtual bit of physical buffer '15' is '1'. Therefore, the Exclusive Or 350 in FIG. 3 produces a '0' when the addresses are as shown in FIG. 9. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '1' indicating that the instruction can issue. This result may be checked by noting that the physical buffer '3' is associated with the virtual rename buffer '19' in FIG. 9. The instruction thus can be issued.

Figure 10:
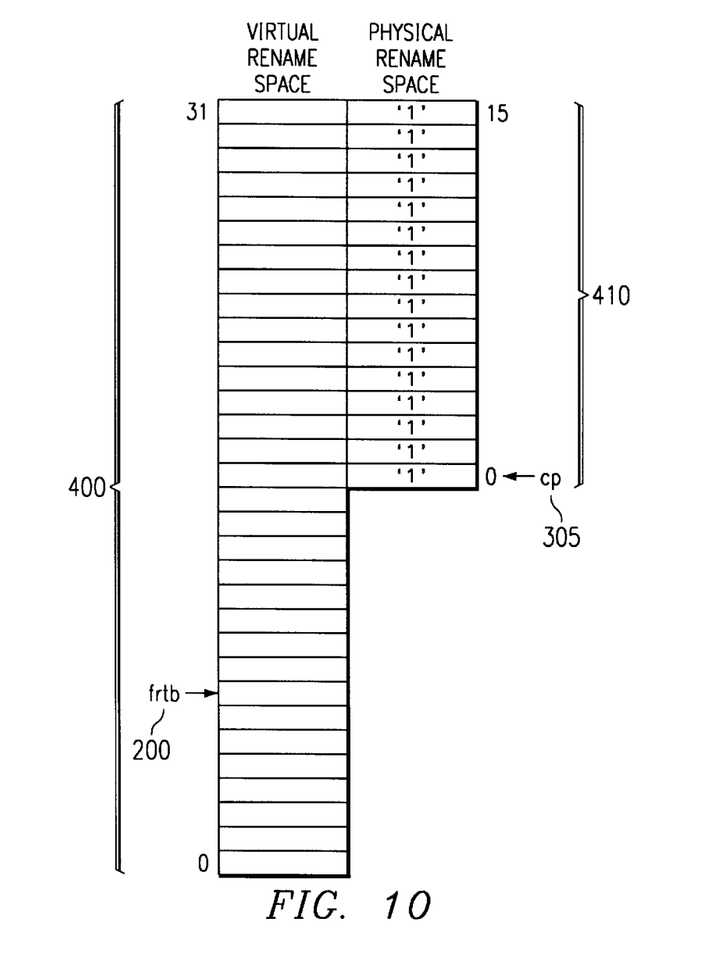

Referring now to FIG. 10, the target buffer pointer 200 points to one of the lower 16 virtual buffers so that the value of the most significant bit of the target buffer pointer 200 is '0'. The physical buffer address of physical buffer '15' points to a location that corresponds to one of the upper 16 virtual buffers so that the value of the virtual bit of physical buffer '15' is '1'. Therefore, the Exclusive Or 350 in FIG. 3 produces a '1' when the addresses are as shown in FIG. 10. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '0' indicating that the instruction cannot issue. This result may be checked by noting that the physical buffer '7' is not associated with the virtual rename buffer '7' in FIG. 10. The instruction thus cannot be issued until physical buffer '7' is associated with virtual rename buffer '7'.

Figure 11:
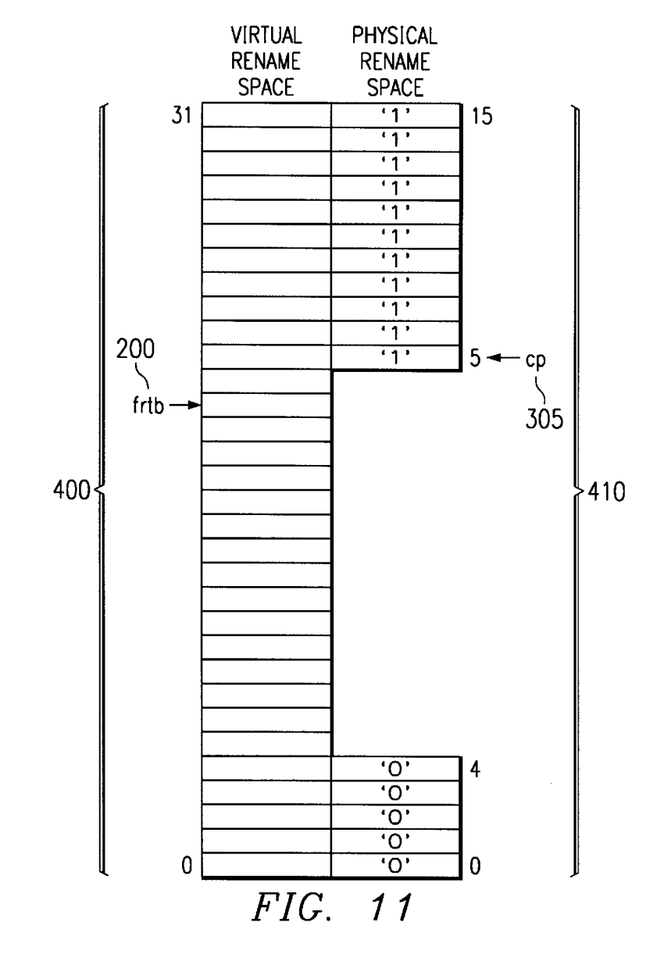

Referring now to FIG. 11, the target buffer pointer 200 points to one of the upper 16 virtual buffers so that the value of the most significant bit of the target buffer pointer 200 is '1'. The physical buffer address of physical buffer '15' points to a location that corresponds to one of the upper 16 virtual buffers so that the value of the virtual bit of physical buffer '15' is '1'. Therefore, the Exclusive Or 350 in FIG. 3 produces a '0' when the addresses are as shown in FIG. 11. The two's complement subtraction of the four lower order bits of the completion pointer 305 from the four lower order bits of the target buffer pointer 200 results in the carry out 390 in FIG. 3 being a '0'. That is, the lower order bits of the target buffer pointer 200 is not greater than or equal to the lower order bits of the completion pointer 305. Thus, Exclusive Or 330 of FIG. 3 produces a '0' indicating that the instruction cannot issue. This result may be checked by noting that the physical buffer '3' is not associated with the virtual rename buffer '18' in FIG. 11. The instruction thus cannot be issued until physical buffer '3' is associated with virtual rename buffer '18'.

Figure 12:
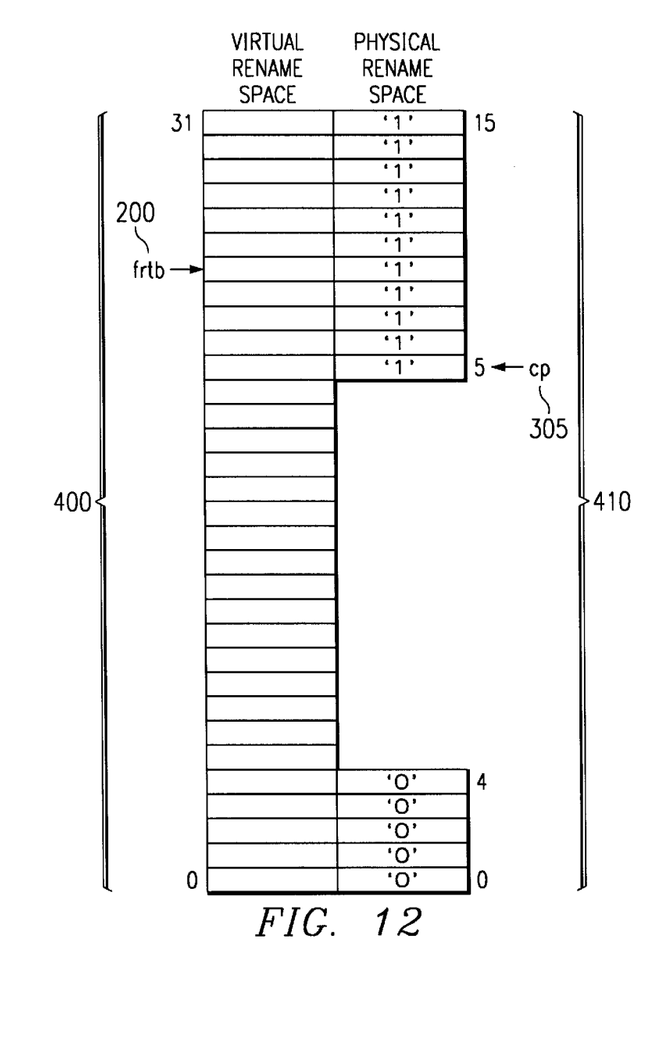

Referring now to FIG. 12, the target buffer pointer 200 points to one of the upper 16 virtual buffers so that the value of the most significant bit of the target buffer pointer 200 is '1'. The physical buffer address of physical buffer '15' points to a location that corresponds to one of the upper 16 virtual buffers so that the value of the virtual bit of physical buffer '15' is '1'. Therefore, the Exclusive Or 350 in FIG. 3 produces a '0' when the addresses are as shown in FIG. 12. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '1' indicating that the instruction can issue. This result may be checked by noting that the physical buffer '9' is associated with the virtual rename buffer '25' in FIG. 12. The instruction thus can be issued.

Figure 13:
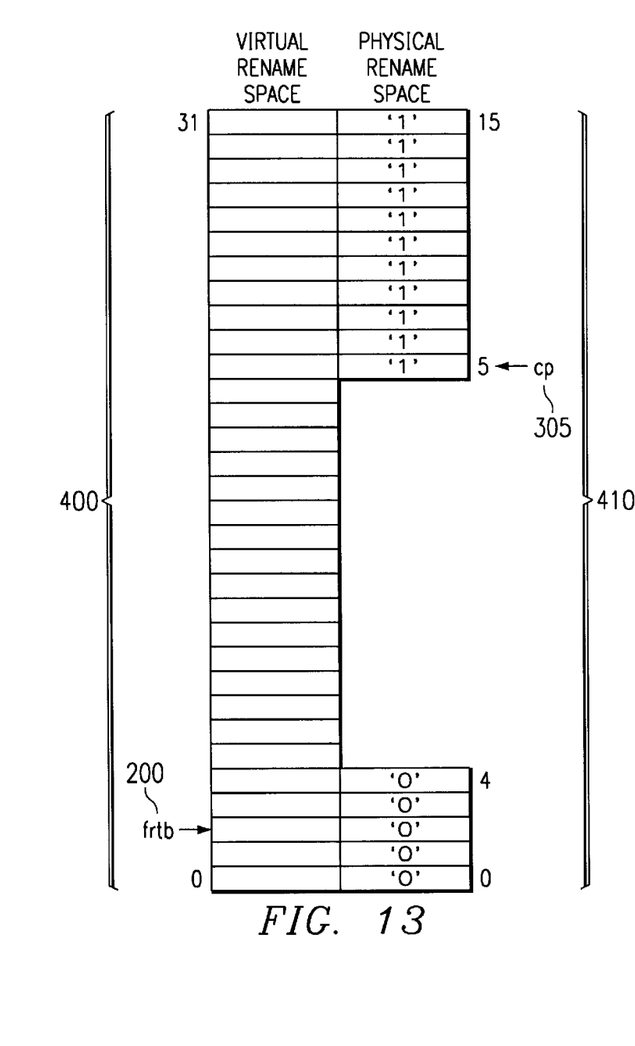

Referring now to FIG. 13, the target buffer pointer 200 points to one of the lower 16 virtual buffers so that the value of the most significant bit of the target buffer pointer 200 is '0'. The physical buffer address of physical buffer '15' points to a location that corresponds to one of the upper 16 virtual buffers so that the value of the virtual bit of physical buffer '15' is '1'. Therefore, the Exclusive Or 350 in FIG. 3 produces a '1' when the addresses are as shown in FIG. 13. The two's complement subtraction of the four lower order bits of the completion pointer 305 from the four lower order bits of the target buffer pointer 200 results in the carry out 390 in FIG. 3 being a '0'. That is, the lower order bits of the target buffer pointer 200 is greater than or equal to the lower order bits of the completion pointer 305. Thus, Exclusive Or 330 of FIG. 3 produces a '1' indicating that the instruction can issue. This result may be checked by noting that physical buffer '2' is associated with the virtual rename buffer '2' in FIG. 13. The instruction thus can be issued.

Figure 14:
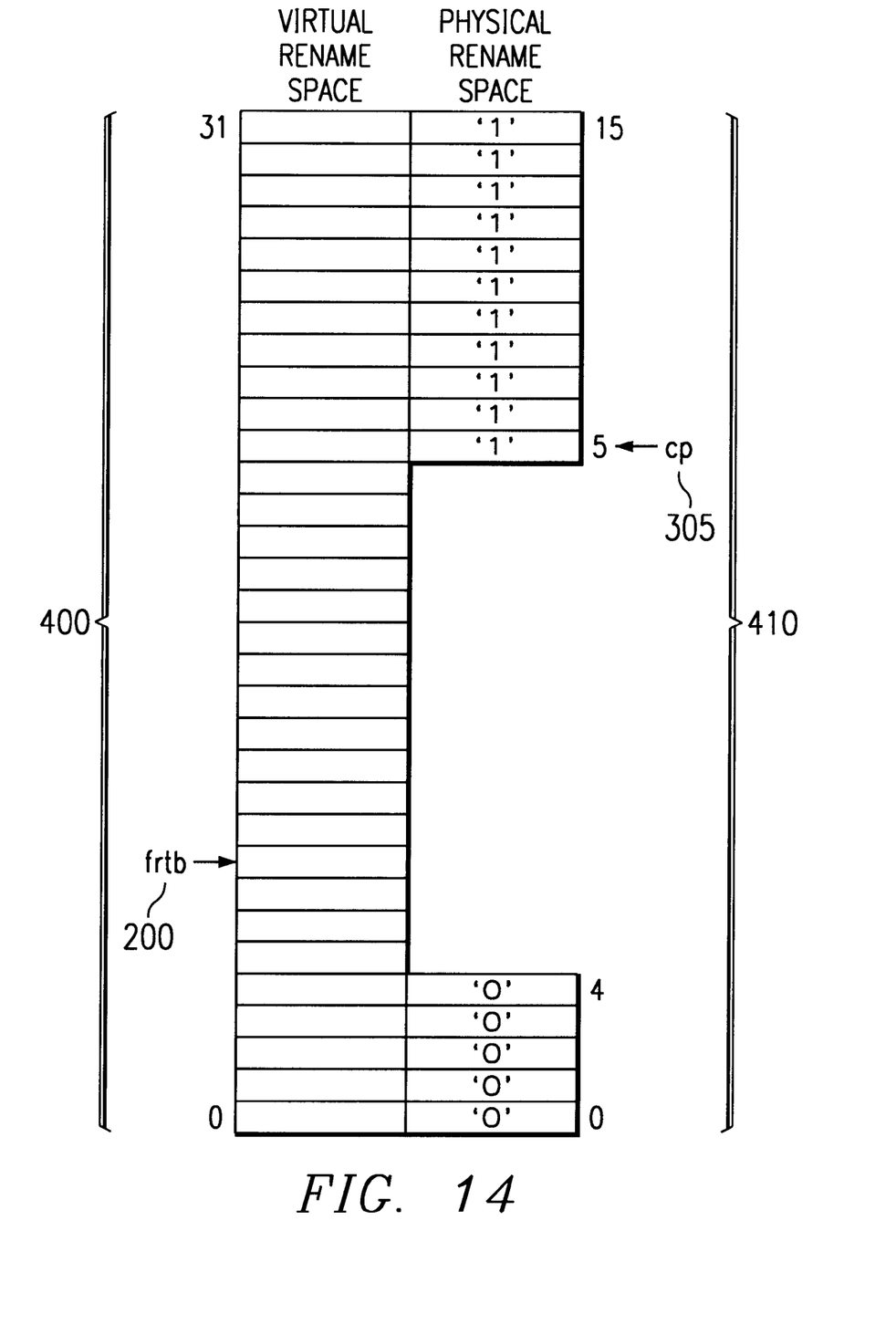

Referring now to FIG. 14, the target buffer pointer 200 points to one of the lower 16 virtual buffers so that the value of the most significant bit of the target buffer pointer 200 is '0'. The physical buffer address of physical buffer '15' points to a location that corresponds to one of the upper 16 virtual buffers so that the value of the virtual bit of physical buffer '15' is '1'. Therefore, the Exclusive Or 350 in FIG. 3 produces a '1' when the addresses are as shown in FIG. 14. The two's complement subtraction of the four lower order bits of the completion pointer 305 from the four lower order bits of the target buffer pointer 200 results in the carry out 390 in FIG. 3 being a '1'. That is, the lower order bits of the target buffer pointer 200 is greater than or equal to the lower order bits of the completion pointer 305. Thus, Exclusive Or 330 of FIG. 3 produces a '0' indicating that the instruction cannot issue. This result may be checked by noting that the physical buffer '8' is not associated with the virtual rename buffer '8' in FIG. 14. The instruction thus cannot be issued until physical buffer '8' is associated with virtual rename buffer '8'.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for virtual and physical buffer wrap detection in a microprocessor system, the method comprising:

performing a subtraction of a first pointer pointing to a first buffer address from a second pointer pointing to a second buffer address, wherein a carry out results from the subtraction;

comparing the carry out and a virtual bit associated with a location to produce a result, wherein the virtual bit represents at least a portion of a virtual address corresponding to the location;

comparing the result with a most significant bit of the second pointer; and responsive to a match between the most significant bit of the second pointer and the result, indicating that an instruction may issue.

2. The method of claim 1 wherein the first pointer is a completion pointer and the second pointer is a target buffer pointer.

3. The method of claim 2 wherein the target pointer points to a virtual buffer allocated to a target and the completion pointer points to a next buffer position to free as instructions are completed.

4. The method of claim 1 wherein an exclusive OR operation is performed to compare the carry out and a virtual bit associated with a rename buffer within the plurality of rename buffers to form a result.

5. The method of claim 4 wherein the virtual bit is used to map a physical buffer onto a virtual buffer.

6. The method of claim 1 wherein the location is a highest rename buffer within a plurality of rename buffers.

7. A method for efficient wrap detection in a microprocessor system, the system microprocessor including a plurality of rename buffers, the method comprising:
   providing at least one virtual rename buffer for allocation when one of a plurality of physical rename buffers is unavailable;
   allocating a virtual rename buffer to a target of an instruction;
   providing a one or more virtual bit for each of the plurality of physical rename buffers to identify to which of the at least one virtual rename buffer each of the plurality of physical rename buffers is currently mapped;
   providing a means for identifying a one of the plurality of physical rename buffers that has currently become available;
   identifying whether a virtual rename buffer of the at least one virtual rename buffer allocated to a particular instruction is currently associated with one of the plurality of physical rename buffers by comparing the one or more virtual bit of a predetermined one or the plurality of physical rename buffers, an identification of a one of the plurality of physical rename buffers that has currently become available, and an identification of the virtual rename buffer.

8. The method of claim 7 further comprising an allocation pointer to identify a next virtual rename buffer to be allocated to the target of an instruction.

9. The method of claim 8 wherein the allocation pointer is incremented by modular the size of one of the at least one virtual rename bufffer.

10. The method of claim 7 wherein the means for identifying a one of the plurality of physical buffers that has currently become available is a completion pointer that is incremented when an instruction completes.

11. The method of claim 10 wherein the completion pointer is incremented by modular the size of a virtual rename buffer.

12. The method of claim 7 wherein the number of the at least one virtual rename buffer is twice the number of the plurality of physical rename buffers.

13. The method of claim 12 wherein the one or more virtual bit is one bit that indicates whether a one of the plurality of physical rename buffers is associated with an upper half or a lower half of the at least one virtual rename buffer.

14. The method of claim 13 wherein the one or more virtual bit of the highest physical rename buffer is the only one or more virtual bit essential to the wrap detection method.

15. A system for efficient wrap detection, the system comprising:
   a plurality of rename buffers, at least one of which is a virtual rename buffer;
   a target buffer pointer that points to a one of the at least one virtual rename buffer allocated to a target;
   a completion pointer that points to the next physical rename buffer position to become available as instructions complete;
   a flag associated with one of a plurality of physical rename buffers that indicates the at least one virtual rename buffer with which the one of a plurality of physical rename buffers is currently associated;
   a logic unit for comparing the target buffer pointer, the completion pointer, and the flag to determine whether an instruction may issue.

16. The system of claim 15 wherein the at least one virtual rename buffer comprises two thirds (2/3) of the plurality of rename buffers and wherein the plurality of physical rename buffers comprise the other one third (1/3) of the plurality of rename buffers.

17. The system of claim 16 wherein the at least one virtual rename buffer are mapped to a lower space comprised of 16 buffers and an upper space comprised of 16 buffers for a total of 32 virtual rename buffers.

18. The system of claim 17 wherein the flag is a virtual bit indicating whether the highest physical rename buffer is currently associated with the lower space or the upper space.

19. The system of claim 15 wherein the logic unit further comprises:
   a comparator to determine whether the target buffer pointer is greater than or equal to the completion pointer;
   a first exclusive or gate, the inputs of which are the invert of the higher order bit of the target buffer pointer and the invert of the flag;
   a second exclusive or gate, the inputs of which are the output of the first exclusive or gate and the output of the comparator; and
   an output from the second exclusive or gate which indicates whether an instruction can issue.

20. The system of claim 14 wherein the comparator is a two's complement subtractor, subtracting the lower order bits of the completion pointer from the lower order bits of the target buffer pointer, the output of which is the carry from the subtraction.

21. An apparatus in a microprocessor system, the microprocessor system including a plurality of rename buffers, the apparatus comprising:
   first performing means for performing a two's complement subtraction of a completion pointer from a target pointer, the target pointer pointing to a rename buffer allocated to an instruction and the completion buffer pointing to a next buffer position to free as instructions are completed, wherein a carry out results from the two's complement subtraction;
   exclusive OR means for performing an exclusive OR operation using the carry out and a virtual bit associated with a highest rename buffer within the plurality of rename buffers to form a result, wherein the virtual bit is used to map a physical buffer onto a virtual buffer;
   comparing means for comparing the result with a most significant bit of the target pointer; and
   indicating means, responsive to a match between the a most significant bit of the target pointer and the result, for indicating that an instruction can be issued.

* * * * *